(12) United States Patent
Nakamura et al.

(10) Patent No.: US 12,237,976 B2
(45) Date of Patent: Feb. 25, 2025

(54) TOPOLOGY DEDUCTION SYSTEM, TRAFFIC ADDITION DEVICE, AND TRAFFIC ADDITION METHOD

(71) Applicant: Nippon Telegraph and Telephone Corporation, Tokyo (JP)

(72) Inventors: Mizuto Nakamura, Tokyo (JP); Toshihiko Seki, Tokyo (JP); Naoyuki Tanji, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 660 days.

(21) Appl. No.: 17/427,827

(22) PCT Filed: Jan. 23, 2020

(86) PCT No.: PCT/JP2020/002250
§ 371 (c)(1),
(2) Date: Aug. 2, 2021

(87) PCT Pub. No.: WO2020/162197
PCT Pub. Date: Aug. 13, 2020

(65) Prior Publication Data
US 2022/0141094 A1 May 5, 2022

(30) Foreign Application Priority Data
Feb. 6, 2019 (JP) .................. 2019-019341

(51) Int. Cl.
*H04L 41/12* (2022.01)
*H04L 41/14* (2022.01)
*H04L 43/0876* (2022.01)
*H04L 45/00* (2022.01)
*H04L 47/125* (2022.01)

(52) U.S. Cl.
CPC ............ *H04L 41/12* (2013.01); *H04L 41/145* (2013.01); *H04L 43/0876* (2013.01); *H04L 45/70* (2013.01); *H04L 47/125* (2013.01)

(58) Field of Classification Search
CPC ... H04L 41/12; H04L 41/145; H04L 43/0876; H04L 45/70; H04L 47/125
See application file for complete search history.

(56) References Cited

U.S. PATENT DOCUMENTS

| 8,942,256 B1 * | 1/2015 | Barth | H04L 45/12 370/255 |
| 2016/0270131 A1 * | 9/2016 | Hasegawa | H04W 28/0215 |

FOREIGN PATENT DOCUMENTS

| EP | 1068760 B1 * | 3/2006 | ............ H04W 16/18 |
| JP | 2014049851 | 3/2014 | |
| JP | 5695767 | 4/2015 | |

* cited by examiner

*Primary Examiner* — Mandish K Randhawa
(74) *Attorney, Agent, or Firm* — Fish & Richardson P.C.

(57) ABSTRACT

To make it possible to correctly understand a connection relationship of interfaces. A traffic addition device 50 adds to traffic volumes output from a plurality of interfaces of a plurality of network devices A to F in a to-be-estimated network N additional traffic volumes different at the interfaces. This forms a characteristic volume in the traffic volumes. The topology estimation device 10 can thus correctly understand a connection relationship of the interfaces from a correlation between the traffic volumes.

6 Claims, 8 Drawing Sheets

TOPOLOGY DEDUCTION SYSTEM, TRAFFIC ADDITION DEVICE, AND TRAFFIC ADDITION METHOD

CROSS-REFERENCE TO RELATED APPLICATIONS

This application is a National Stage application under 35 U.S.C. § 371 of International Application No. PCT/JP2020/002250, having an International Filing Date of Jan. 23, 2020, which claims priority to Japanese Application Serial No. 2019-019341, filed on Feb. 6, 2019. The disclosure of the prior application is considered part of the disclosure of this application, and is incorporated in its entirety into this application.

TECHNICAL FIELD

The present invention relates to a traffic addition technology.

BACKGROUND ART

Means for understanding a topology have been conventionally studied. A topology is a layout that shows how a plurality of network devices and the like are connected. PTL 1 and PTL 2 propose methods to estimate, from a correlation of traffic volumes at a plurality of interfaces, a connection relationship of the interfaces.

For example, as shown in FIG. 7, in a predetermined to-be-estimated network where a plurality of network devices A, B, . . . include interfaces A1, A2, . . . , B1, B2, . . . , respectively, the traffic volumes transmitted/received at the interfaces are calculated and it is estimated that interfaces having the same traffic volume transmitted/received at the same time t are connected.

Such traffic information is performance information that can be generally acquired by, for example, a network device and the like such as a router, a switch, etc. The traffic information can thus be used to acquire the topology information regardless of the make of the devices and the like.

CITATION LIST

Patent Literature

[PTL 1] Japanese Patent No. 5695767
[PTL 2] Japanese Patent Application Publication No. 2014-049851

SUMMARY OF THE INVENTION

Technical Problem

Unfortunately, there has been a problem that estimating the topology using the above conventional technique in a situation in which there is no variation in traffic will make it difficult to estimate the correct connection relationship because there is no difference in the traffic volumes at the interfaces.

For example, a commercial network of communication carriers has a non-activated network device as a preliminary system for failure occurrence. In the non-activated device, the traffic volumes are nearly constant and have no characteristic changes at the interfaces of the same network device, thus making it difficult to estimate the topology using the conventional technique.

Specifically, as shown in FIG. 8 (a), there is no difference in the traffic volumes transmitted/received at a plurality of interfaces A1 to A10 or in the traffic volumes transmitted/received at a plurality of interfaces B1 to B10. Therefore, for a predetermined interface A, there are a plurality of interfaces B with the same traffic volume. A wrong connection relationship may thus be estimated as shown in FIG. 8 (b).

The present invention was accomplished in light of the above mentioned circumstances. A purpose of the present invention is to make it possible to correctly understand a connection relationship of interfaces.

Means for Solving the Problem

A topology estimation system according to the present invention includes: a topology estimation device that determines, from a correlation between traffic volumes at a plurality of interfaces of a plurality of devices, a connection relationship of the interfaces; and a traffic addition device, the traffic addition device including a traffic addition unit that adds to the traffic volumes output from the plurality of interfaces additional traffic volumes different at the interfaces, respectively.

In the topology estimation system, the traffic addition device further includes a traffic volume calculation unit that calculates, according to the traffic volumes flowing through the plurality of interfaces, the additional traffic volumes to be added to the traffic volumes, respectively.

In the topology estimation system, the topology estimation device further includes a traffic addition determination unit that determines, according to changes of the traffic volumes flowing through the plurality of interfaces, whether to add the additional traffic volumes to the traffic volumes, respectively.

A traffic addition device according to the present invention includes a traffic addition unit that adds to traffic volumes output from a plurality of interfaces additional traffic volumes different at the interfaces, respectively.

The traffic addition device further includes a traffic volume calculation unit that calculates, according to the traffic volumes flowing through the plurality of interfaces, the additional traffic volumes to be added to the traffic volumes, respectively.

The traffic addition device further includes a traffic addition determination unit that determines, according to changes of the traffic volumes flowing through the plurality of interfaces, whether to add the additional traffic volumes to the traffic volumes, respectively.

A traffic addition method according to the present invention is performed by: a topology estimation device that determines, from a correlation between traffic volumes at a plurality of interfaces of a plurality of devices, a connection relationship of the interfaces; and a traffic addition device, the topology estimation device determining, according to changes of the traffic volumes flowing through the plurality of interfaces, whether to add additional traffic volumes to the traffic volumes, respectively, the traffic addition device calculating, if the additional traffic volumes are to be added, the additional traffic volumes to be added to the traffic volumes according to the traffic volumes flowing through the plurality of interfaces, and adding to the traffic volumes output from the plurality of interfaces the calculated additional traffic volumes different at the interfaces, respectively.

Effects of the Invention

The present invention may make it possible to correctly understand a connection relationship of interfaces.

DESCRIPTION OF EMBODIMENTS

Summary of the Invention

In a situation in which the traffic volumes are constant or the traffic volumes have no characteristic changes (for example, there are a plurality of network devices with a similar tendency of the traffic volume), use of the conventional technique makes it difficult to identify the correct opposing device.

Figure 1:
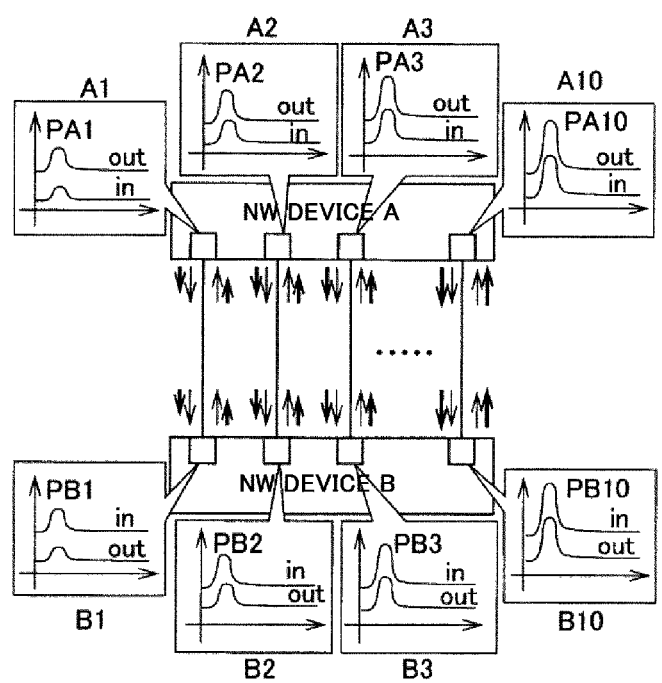
FIG. 1 generally illustrates the invention.

Therefore, as shown in FIG. 1, the present invention adds different sizes of packets PA1, PA2, . . . , PB1, PB2, . . . to the interfaces of the adjacent network devices and the like, respectively. This may form a characteristic amount in the traffic volumes, thereby making it possible to correctly understand the connection relationship of the interfaces from the correlation of the traffic volumes.

One embodiment to practice the present invention will be described below using the drawings.

<Example System Configuration>

Figure 2:
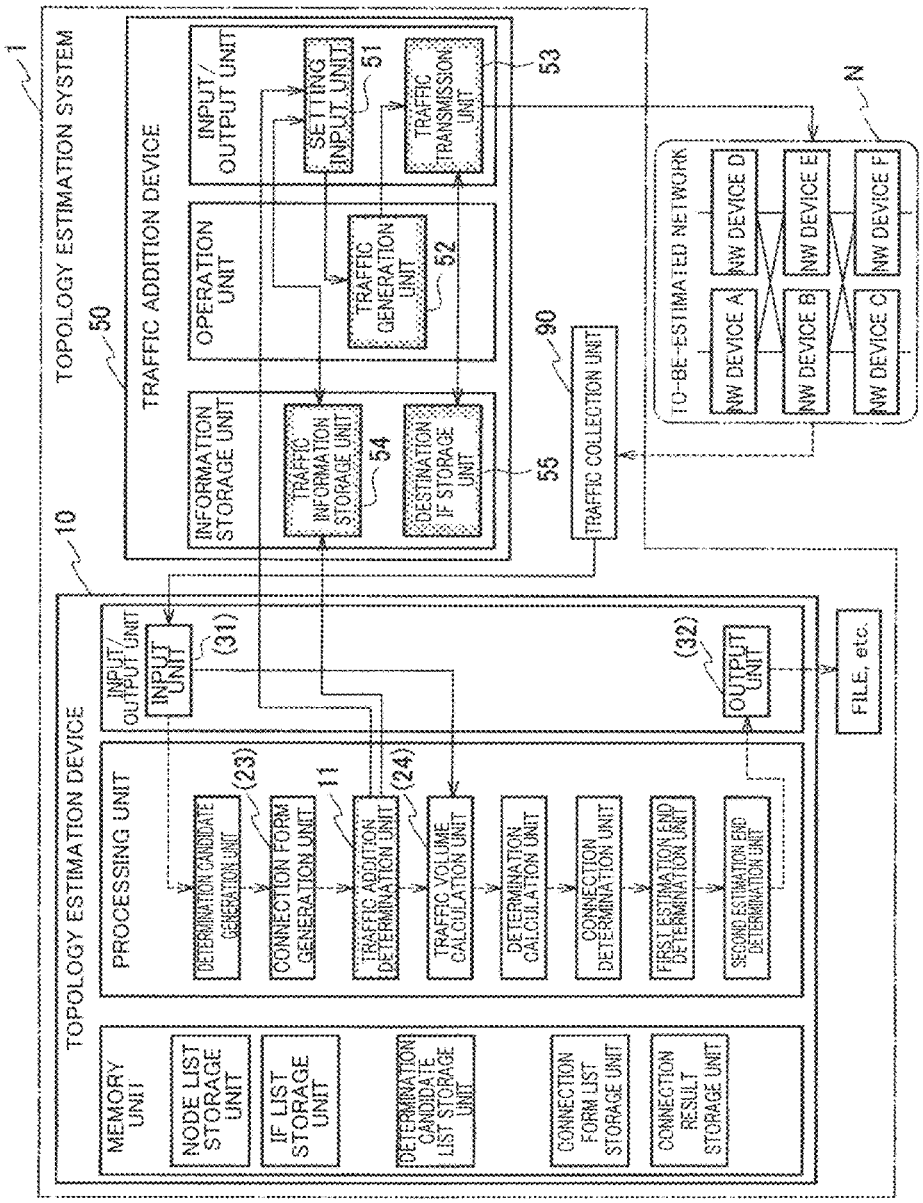
FIG. 2 illustrates an example configuration of a topology estimation system.

FIG. 2 illustrates an example configuration of a topology estimation system 1 according to this embodiment. As shown in FIG. 2, the topology estimation system 1 is configured by including mainly a topology estimation device 10, a traffic addition device 50, and a traffic collection device 90. In the topology estimation system 1, the topology estimation device 10 estimates how a plurality of network devices A to F included in a predetermined to-be-estimated network N are connected, in other words, the connection relationship (topology) of a plurality of interfaces of the plurality of network devices A to F.

The topology estimation device 10 as shown in FIG. 2 is the same as the topology estimation device 10 shown in FIG. 1 of PTL 2. Note that, in this embodiment, a traffic addition determination unit 11 is added between a connection form generation unit (23) and a traffic volume calculation unit (24). The parenthetical reference numerals as shown in FIG. 2 are the same as the reference numerals in [PTL 2]. In addition, among the connecting lines between the function units shown in FIG. 1 in PTL 2, FIG. 2 only show the main lines in processing in broken lines and omits other connecting lines. In FIG. 2, this embodiment is characterized by the dotted function units and the solid connecting lines.

<Example Configuration of Traffic Addition Device>

In the system configuration shown in FIG. 2, this embodiment adds the traffic addition device 50 to the system configuration in PTL 2. Therefore, first, an example configuration of the traffic addition device 50 will be described.

As shown in FIG. 2, the traffic addition device 50 is configured by including mainly a setting input unit 51, a traffic generation unit 52, a traffic transmission unit 53, a traffic information storage unit 54, and a destination interface storage unit 55.

The setting input unit 51 has a function of reading traffic information from the traffic information storage unit 54. The setting input unit 51 also has a function of calculating traffic volumes to be flowed additionally through the interfaces of the plurality of network devices A to F included in the to-be-estimated network N, respectively, according to the traffic volumes of the to-be-estimated network N included in the traffic information.

Specifically, the setting input unit 51 has a function of calculating, according to the traffic volumes flowing through the plurality of interfaces of the plurality of network devices A to F, additional traffic volumes to be added to the traffic volumes, respectively. In so doing, the setting input unit 51 calculates such that the additional traffic volumes to be added to the traffic volumes are different at the interfaces.

The traffic generation unit 52 has a function of generating the traffic volumes different at the interfaces, which are calculated by the setting input unit 51. Here, the traffic means data (information) flowing through a network. This embodiment is directed to a network device. So, the traffic generation unit 52 generates packets of different data sizes at the interfaces. Note that this embodiment may also be directed to a server device other than the network device and thus may change the data size of a segment instead of the packet.

The traffic transmission unit 53 has a function of transmitting the packets of different data sizes at the interfaces generated by the traffic generation unit 52 to the plurality of network devices A to F, respectively. The traffic transmission unit 53 also has a function of allowing the packets to be output from the interfaces of the plurality of network devices A to F.

In other words, the traffic transmission unit 53 adds to the traffic volumes output from the plurality of interfaces of the plurality of network devices A to F the additional traffic volumes different at the interfaces generated by the traffic generation unit 52.

The traffic information storage unit 54 has a function of storing the traffic information of the to-be-estimated network N such that they may be read out therefrom. Specifically, the traffic information storage unit 54 stores the traffic and its volume flowing through the plurality of interfaces of the plurality of network devices A to F such that they may be read out therefrom as the traffic information.

The destination interface storage unit 55 has a function of associating an interface ID of the destination to which the traffic volume is added by the traffic transmission unit 53 transmitting the packets with the network device ID and storing them as destination information that may be read out therefrom.

An example configuration of the traffic addition device 50 has been described above. Note that the setting input unit 51, the traffic generation unit 52, and the traffic transmission unit 53 correspond to "a traffic volume calculation unit" and "a traffic addition unit" in the claims, respectively.

<Example Configuration of Topology Estimation Device>

Next, an example configuration of the topology estimation device 10 will be described. As described in PTL 2, the topology estimation device 10 is a device that estimates, from a correlation of the traffic volumes at a plurality of interfaces of a plurality of network devices, a connection relationship of the interfaces (topology). In this embodiment, the topology estimation device 10 is configured by further including a traffic addition determination unit 11 in addition to the configuration described in PTL 2.

The traffic addition determination unit 11 functions between the connection form generation unit (23) and the traffic volume calculation unit (24). The traffic addition determination unit 11 has a function of determining whether to add additional traffic volumes to the traffic volumes of the to-be-estimated network N according to changes of the traffic volumes of the to-be-estimated network N before calculating and estimating the topology of the to-be-estimated network N.

Specifically, the traffic addition determination unit 11 determines whether to add additional traffic volumes to the traffic volumes according to changes of the traffic volumes flowing through the plurality of interfaces of the plurality of network devices A to F.

An example configuration of the topology estimation device 10 has been described above. Note that although this embodiment is described with respect to the topology estimation device 10 including the traffic addition determination unit 11, the traffic addition device 50 may include the traffic addition determination unit 11. Refer to the description in PTL 2 for other things including the function units except the traffic addition determination unit 11.

<Traffic Collection Device>

Next, the traffic collection device 90 will be described. The traffic collection device 90 has a function of collecting traffic information from the to-be-estimated network N. Specifically, the traffic collection device 90 collects the traffic and its volume flowing through the plurality of interfaces of the plurality of network devices A to F, and transmits them to an input unit (31) of the topology estimation device 10 along with the acquired time (time stamp) of each set of the traffic information.

<Examples of Method of Adding Traffic Volume/Method of Varying Additional Traffic Volume>

Next, examples of a method of adding a traffic volume and a method of varying an additional traffic volume will be described. The traffic generation unit 52 and the traffic transmission unit 53 in the traffic addition device 50 perform the traffic volume addition process and the traffic volume variation process.

Figure 3:
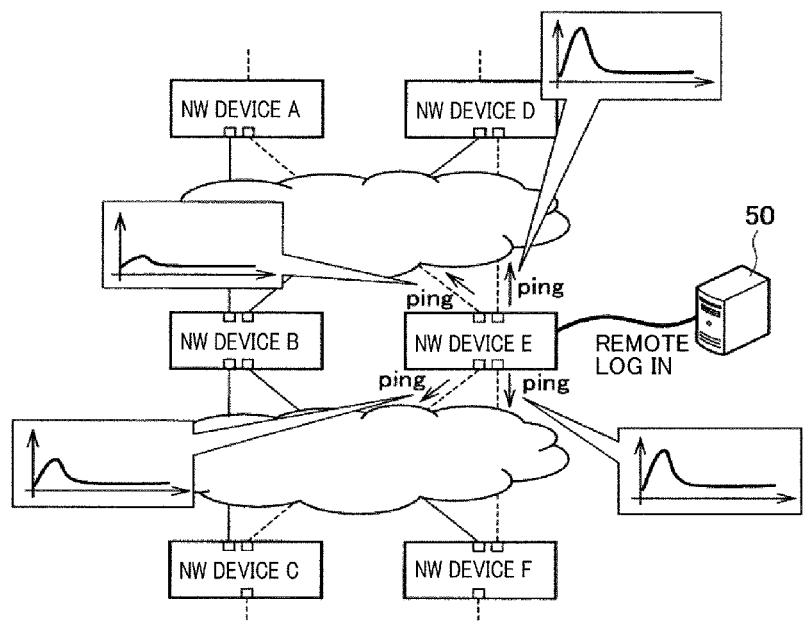
FIG. 3 illustrates an image of traffic volume addition.

As shown in FIG. 3, methods of adding a traffic volume to the plurality of adjacent network devices A to F include, for example, the traffic addition device 50 remote logging in the network device E using Telnet and the like and flowing packets in the adjacent network devices A, C, D, F using the ping and the like.

Methods of varying the additional traffic volume include, for example, changing the additional traffic volume by varying the data size per one packet. The ping may specify any data size of a packet and specify different data sizes at the interfaces calculated by the setting input unit 51. In FIG. 3, the additional traffic volume may be added to the traffic volume that is output from the network device E to the network device A by performing "ping -l 100 ip. addr_A_sby". The value of "100" is the data size of a packet. Likewise, the additional traffic volume may be added to the traffic volume that is output from the network device E to the network devices C, D, and E by performing "ping -l 200 ip. addr_C_sby", "ping -l 300 ip. addr_D_sby", "ping -l 400 ip. addr_E_sby", respectively.

This may provide a characteristic amount in the traffic volumes output from the interfaces of the network device E. Note that the traffic volume may be added by a user using an Operation System (OpS) or by the traffic addition device 50 executing a script of the ping command.

<Example of Method of Calculating Additional Traffic Volume>

Next, an example of a method of calculating an additional traffic volume will be described. The setting input unit 51 in the traffic addition device 50 performs the additional traffic volume calculation process.

Figure 4:
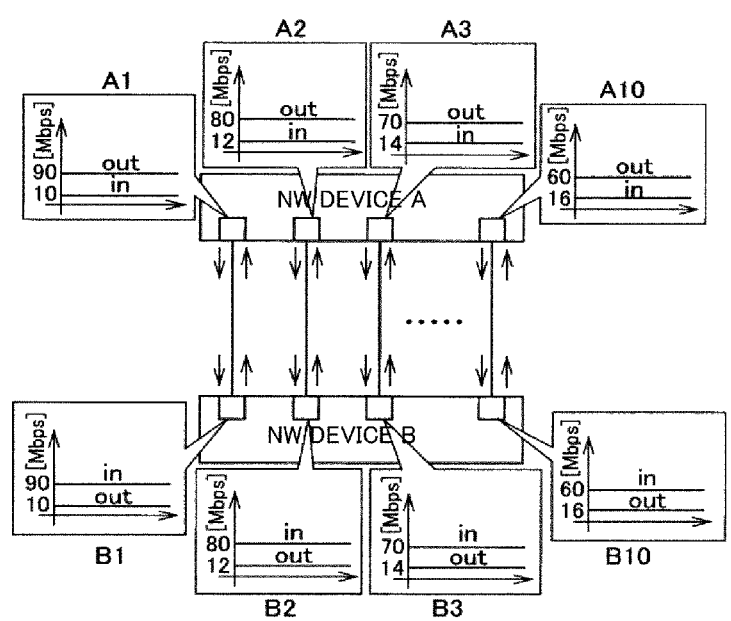
FIG. 4 is a reference figure to describe a method of calculating an additional traffic volume.

Here, as shown in FIG. 4, the average traffic volume flowing through the interfaces of the non-active devices may not always be the same value. Then, it is necessary to vary the additional traffic volume on the basis of the volume that is flowing steadily. The base values include the average, the maximum, the minimum, and the median, etc.

For example, according to the average of the traffic volume that is flowing steadily through the active devices, calculation is performed to add a traffic volume as any X [%] to the average traffic volume. Specifically, it is assumed that for IF (IF_$Y_1$, IF_$Y_2$ . . . ) of the network device Y, the original flowing traffic volume is IF_$Y_i$ (t) (i=1, 2 . . . ). In so doing, new IF_$Y_i$ (t), which is the traffic volume flowing through the IF when the additional traffic volume is added, may be calculated by formula (1). Note that add_IF_$Y_i$ indicates the added traffic volume.

[Formula 1]

$$\text{new IF\_}Y_i(t) = \text{add\_IF\_}Y_i + \text{IF\_}Y_i(t) \quad (1)$$

where add_IF_$Y_i$=X [%]×mean{new IF_$Y_{i-1}$(t)} (i>1)
add_IF_$Y_i$=0 (i=1)

<Example of Method of Determining Traffic Volume Addition>

Next, an example of a method of determining traffic volume addition will be described. The traffic addition determination unit 11 in the topology estimation device 10 performs the process of determining traffic volume addition.

Figure 5:
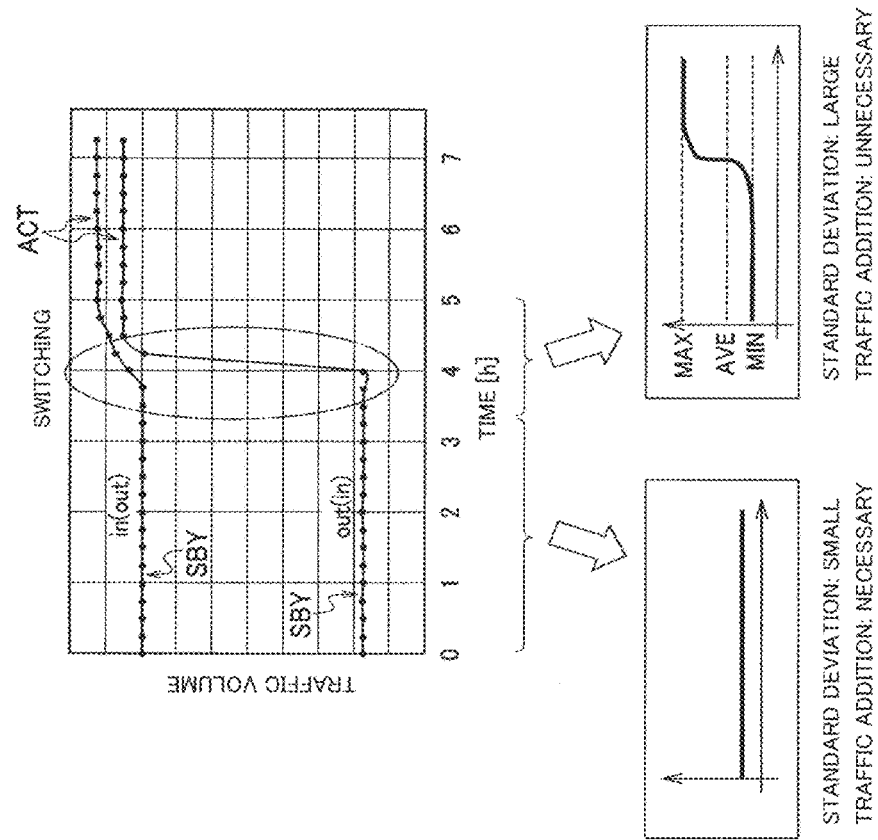
FIG. 5 is a reference figure to describe a method of determining whether to add a traffic volume.

The traffic addition determination unit 11 determines whether to add a traffic volume according to changes of the traffic volumes of the network input to the topology estimation device 10. A non-activated device is automatically switched to an activated device if abnormality occurs in the activated device. It is thus not necessary to flow additional traffic volume after being switched to the activated device. After being switched, it is necessary to add a traffic volume to the non-activated device that has changed to a different device. Thus, as shown in FIG. 5, the need to add a packet is determined by, for example, according to the waveform (variation) of the traffic volume. Specifically, if the standard deviation of the traffic volume in a predetermined time is below a threshold, the calculated traffic volume to be added is flowed additionally and if the standard deviation is above the threshold, no traffic volume is added. In addition to the standard deviation or alone, according to the slope of the waveform change of the traffic volume, the additional traffic volume may be added if the slope is positive and the additional traffic volume may not be added if the slope is negative.

<Example Operation of Topology Estimation System>

Figure 6:
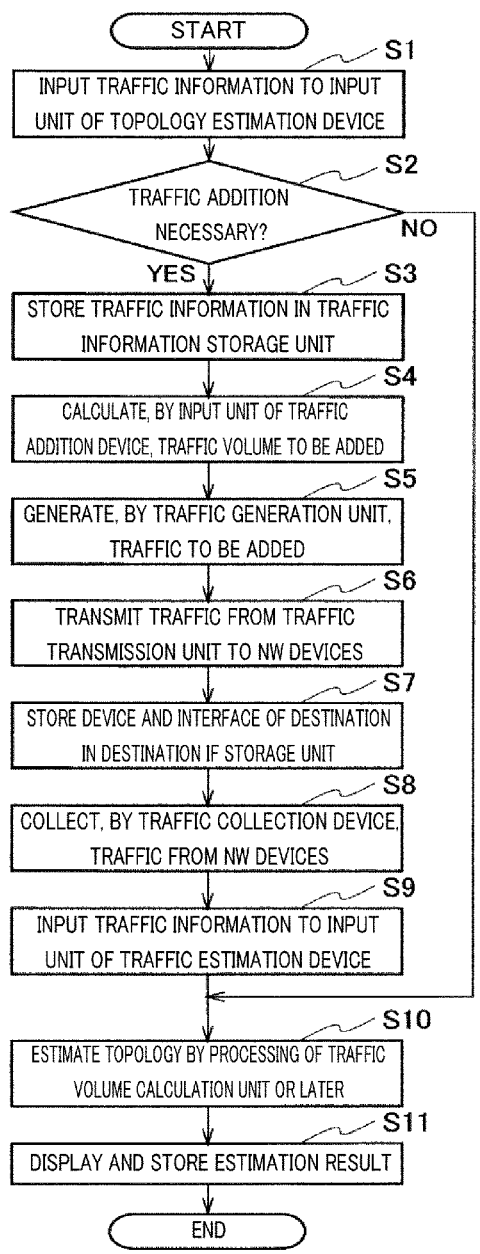
FIG. 6 illustrates a process flow of a traffic volume addition method.
Figure 7:
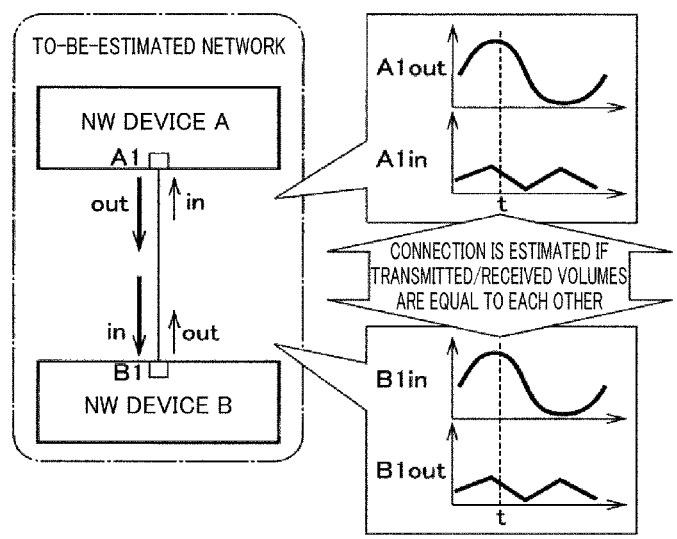
FIG. 7 is a reference figure to describe a method of estimating a connection relationship of interfaces.
Figure 8:
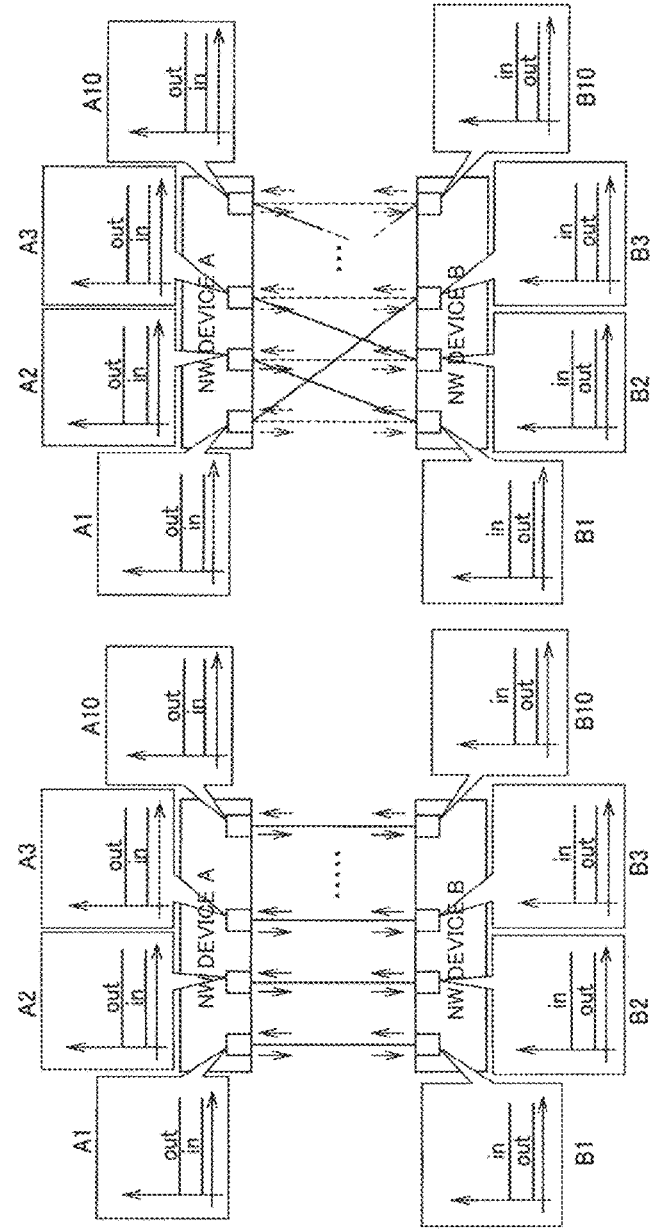
FIG. 8 is a reference figure to describe the problem.

Next, a traffic volume addition method performed by the topology estimation system 1 will be described. FIG. 6 illustrates a process flow of the traffic volume addition method.

Step S1: First, the traffic collection device 90 collects, from the plurality of network devices A to F included in the to-be-estimated network N, the traffic volumes flowing through the plurality of interfaces of the plurality of network devices A to F. Then, the traffic collection device 90 transmits to the input unit (31) in the topology estimation device 10 the collected traffic information along with its time stamp.

Step S2: Next, if the topology estimation device 10 receives the traffic information from the traffic collection device 90, the traffic addition determination unit 11 determines whether to add an additional traffic volume to the traffic volumes according to the time change of the traffic volumes flowing through the plurality of interfaces of the plurality of network devices A to F. For example, the traffic addition determination unit 11 determines to add the traffic volume if the standard deviation of each traffic volume is below a threshold. In addition, the traffic addition determination unit 11 determines not to add the traffic volume if the standard deviation of each traffic volume is equal to or more than the threshold. In so doing, the topology estimation device 10 may determine whether to add the traffic volume according to the slope of the waveform change of the traffic volumes. If it is determined not to add the traffic volume, then control skips steps S3 to S9 and passes to step S10.

Step S3: If it is determined to add the traffic volume, then the traffic addition determination unit 11 transmits the traffic information received from the traffic collection device 90 to the traffic addition device 50. The traffic addition device 50 stores the traffic information in the traffic information storage unit 54.

Step S4: Next, the setting input unit 51 in the traffic addition device 50 reads and refers to the traffic information from the traffic information storage unit 54. The setting input unit 51 then calculates, according to the traffic volumes flowing through the plurality of interfaces of the plurality of network devices A to F, the additional traffic volumes to be added to the traffic volumes such that different traffic volumes are provided at the interfaces.

Step S5: Next, then the traffic generation unit 52 generates the different traffic volumes at the interfaces calculated at step S4. For example, the traffic generation unit 52 generates packets of different data sizes at the interfaces.

Step S6: Next, the traffic transmission unit 53 transmits the packets of different data sizes at the interfaces generated at step S5 to the plurality of network devices A to F in the to-be-estimated network N and allows the packets to be output from the interfaces of the plurality of network devices A to F.

Step S7: Next, then the traffic transmission unit 53 associates the network device IDs of the destinations to which the packets are transmitted at step S6 with the interface IDs and stores them as the destination information in the destination interface storage unit 55.

Step S8: Next, the traffic collection device 90 recollects the traffic volumes flowing through the plurality of interfaces of the plurality of network devices A to F from the plurality of network devices A to F included in the to-be-estimated network N.

Step S9: Next, the traffic collection device 90 transmits the traffic information recollected at step S8 to the input unit (31) in the topology estimation device 10.

Step S10: Subsequently, when the topology estimation device 10 re-receives the traffic information from the traffic collection device 90, the traffic volume calculation unit (24) and the like calculates and estimates the topology of the to-be-estimated network N using the re-received traffic information.

Step S11: Finally, the output unit (32) of the topology estimation device 10 displays the topology of the to-be-estimated network N that is calculated and estimated at step S10 on a monitor and stores it in a file.

Effects of Embodiment

Finally, the effects of this embodiment will be described. According to this embodiment, the traffic addition device 50 adds to the traffic volumes output from the plurality of interfaces of the plurality of network devices A to F in the to-be-estimated network N additional traffic volumes different at the interfaces. This may form a characteristic amount in the traffic volumes so that the topology estimation device 10 may correctly understand the connection relationship of the interfaces from the correlation of the traffic volumes.

Note that the topology estimation device 10, the traffic addition device 50, and the traffic collection device 90 described in this embodiment may be provided by a computer that includes components such as a CPU, a memory, an input/output interface, and a communication interface. In addition, a program to allow a computer to function as those devices and a storage medium of the program may also be provided.

REFERENCE SIGNS LIST

1 Topology estimation system
10 Topology estimation device
11 Traffic addition determination unit
50 Traffic addition device
51 Setting input unit
52 Traffic generation unit
53 Traffic transmission unit
54 Traffic information storage unit
55 Destination interface storage unit
90 Traffic collection device

The invention claimed is:

1. A topology estimation system comprising:
 a topology estimation device configured to determine, from a correlation between traffic volumes at a plurality of interfaces of a plurality of devices, a connection relationship of the plurality of interfaces; and
 a traffic addition device, the traffic addition device comprising:
  a traffic addition unit configured to add to traffic volumes output from the plurality of interfaces additional traffic volumes that are different at the plurality of interfaces, respectively; and
  a traffic volume calculation unit configured to calculate, according to the traffic volumes flowing through the plurality of interfaces, the additional traffic volumes to be added to the traffic volumes, respectively, wherein each additional traffic volume to be added to a respective interface is calculated as a predefined percentile of an average traffic volume through the plurality of interfaces.

2. The topology estimation system according to claim 1, further comprising a traffic addition determination unit configured to determine, according to changes of the traffic volumes flowing through the plurality of interfaces, whether to add the additional traffic volumes to the traffic volumes, respectively.

3. The topology estimation system according to claim 2, wherein the traffic addition determination unit is configured to:

determine, whether a standard deviation of the respective traffic volume through each of the plurality of interfaces during a predefined duration of time is below a threshold; and determine to add the additional traffic volumes to the traffic volumes in response to determining that the standard deviation of the respective traffic volume through each of the plurality of interfaces during a predefined duration of time is below the threshold.

4. A traffic addition device comprising:

a traffic addition unit configured to add to traffic volumes output from the plurality of interfaces additional traffic volumes that are different at a plurality of interfaces, respectively, wherein the additional traffic volumes are added by transmitting data packets having varying interface-specific packet sizes through the plurality of interfaces; and a traffic volume calculation unit configured to calculate, according to the traffic volumes flowing through the plurality of interfaces, the additional traffic volumes to be added to the traffic volumes, respectively, wherein each additional traffic volume to be added to a respective interface is calculated as a predefined percentile of an average traffic volume through the plurality of interfaces.

5. The traffic addition device according to claim 4, further comprising a traffic addition determination unit configured to determine, according to changes of the traffic volumes flowing through the plurality of interfaces, whether to add the additional traffic volumes to the traffic volumes, respectively.

6. A traffic addition method, comprising:

by a topology estimation device, determining, from a correlation between traffic volumes at a plurality of interfaces of a plurality of devices, a connection relationship of the plurality of interfaces; and by a traffic addition device, determining, according to changes of the traffic volumes flowing through the plurality of interfaces, whether to add additional traffic volumes to the traffic volumes, respectively, calculating, when the additional traffic volumes are to be added, the additional traffic volumes to be added to the traffic volumes according to the traffic volumes flowing through the plurality of interfaces, wherein each additional traffic volume to be added to a respective interface is calculated as a predefined percentile of an average traffic volume through the plurality of interfaces, and adding to traffic volumes output from the plurality of interfaces the calculated additional traffic volumes that are different at the plurality of interfaces, respectively, wherein the additional traffic volumes are added by transmitting data packets having varying interface-specific packet sizes through the plurality of interfaces.

* * * * *